US010533872B2

(12) United States Patent
Moore et al.

(10) Patent No.: US 10,533,872 B2
(45) Date of Patent: Jan. 14, 2020

(54) DISPLAYING VISIBLE POINTS OF INTEREST WITH A NAVIGATING SYSTEM

(71) Applicant: Uber Technologies, Inc., San Francisco, CA (US)

(72) Inventors: Christopher Moore, San Francisco, CA (US); Janice J. Suh, San Francisco, CA (US); Benjamin Kadlec, Boulder, CO (US); Christine Misuye Tao, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 200 days.

(21) Appl. No.: 15/650,722

(22) Filed: Jul. 14, 2017

(65) Prior Publication Data

US 2019/0017842 A1    Jan. 17, 2019

(51) Int. Cl.
*G01C 21/00* (2006.01)
*G01C 21/36* (2006.01)
*G01C 21/34* (2006.01)

(52) U.S. Cl.
CPC ..... *G01C 21/3682* (2013.01); *G01C 21/3407* (2013.01)

(58) Field of Classification Search
CPC ................ G01C 21/3682; G01C 21/3407; G01C 21/26; G01C 21/36; G01C 21/3679; G01C 21/3644
USPC ........... 701/400, 426, 428, 438, 457; 700/56
See application file for complete search history.

(56) References Cited

U.S. PATENT DOCUMENTS

| 2004/0054428 A1* | 3/2004 | Sheha ............... G01C 21/3664 700/56 |
| 2006/0058041 A1* | 3/2006 | Cheng .................. H04W 4/02 455/456.3 |
| 2010/0010737 A1* | 1/2010 | Pyo .................... G01C 21/3682 701/532 |
| 2010/0125406 A1* | 5/2010 | Prehofer ............ G01C 21/3641 701/533 |
| 2010/0268449 A1* | 10/2010 | Feng .................. G01C 21/3476 701/533 |

(Continued)

FOREIGN PATENT DOCUMENTS

KR    10-1315576 B1    10/2013

OTHER PUBLICATIONS

PCT International Search Report and Written Opinion, PCT Application No. PCT/IB2018/054118, dated Sep. 10, 2018, 12 pages.

*Primary Examiner* — Shardul D Patel
(74) *Attorney, Agent, or Firm* — Fenwick & West LLP

(57) ABSTRACT

A system determines a set of POIs that are visible from a location. The system stores a visibility map for each POI. A visibility map includes data about locations or regions from which the associated POI is visible. The data may include information about how visible the POI is from different locations. The system divides a region into road bins (e.g., geofences a route passes through). Each road bin is associated with a set of POIs that are visible from locations within the road bin. When the system receives a request from a user device for information about visible POIs, the system determines a road bin that corresponds to the location of the user device, identifies POIs associated with the road bin, and transmits information about the set of POIs to the user device.

20 Claims, 7 Drawing Sheets

(56) References Cited

U.S. PATENT DOCUMENTS

| | | | |
|---|---|---|---|
| 2012/0123678 A1* | 5/2012 | Poppen | G01C 21/3476 |
| | | | 701/468 |
| 2012/0197714 A1* | 8/2012 | Beyeler | G01C 21/3682 |
| | | | 705/14.49 |
| 2014/0039792 A1* | 2/2014 | Seetharam | H04W 4/029 |
| | | | 701/538 |
| 2014/0107917 A1* | 4/2014 | Kazawa | G01C 21/3682 |
| | | | 701/426 |
| 2014/0236482 A1* | 8/2014 | Dorum | G01C 21/34 |
| | | | 701/533 |
| 2015/0285652 A1* | 10/2015 | Peri | G01C 21/3476 |
| | | | 701/438 |
| 2016/0069699 A1* | 3/2016 | Chen | G01C 21/3605 |
| | | | 701/426 |
| 2017/0023374 A1 | 1/2017 | Poppen et al. | |
| 2018/0066948 A1* | 3/2018 | Bailiang | G01C 21/3682 |

* cited by examiner

DISPLAYING VISIBLE POINTS OF INTEREST WITH A NAVIGATING SYSTEM

BACKGROUND

Field of Art

This disclosure relates generally to trip navigation, and in particular to using landmarks to aid navigation.

Description of Art

Computerized systems provide a way of determining routes to destination addresses. The computerized systems can find user-specified addresses on a map, and provide routes between multiple addresses. Mapping and routing can have various applications, such as helping groups of people coordinate travel and directing drivers of vehicles to locations the drivers may be unfamiliar with. For example, mapping and routing systems may provide street names to a driver as the driver approaches turns along a route if the systems have data about the names of the streets along the route. However, it can be difficult to provide meaningful navigation instructions to a driver if the mapping and routing systems do not have information about street names or if the driver is travelling through a region in which one or more streets do not have street names.

SUMMARY

The above and other needs are met by methods, non-transitory computer-readable storage media, and computer systems for identifying points of interest (POIs) that are visible from a location.

Examples described herein provide a computer-implemented method, steps stored on non-transitory computer-readable storage media, and computer systems including one or more computer processors for executing computer program instructions and a non-transitory computer readable storage medium storing instructions executable by the one or more processors. In one example, a method includes receiving location data from a user device and determining a road bin associated with the received location, wherein a road bin is a grouping of data related to a geographic region. The method further includes identifying a set of POIs that are visible to an observer from within the road bin with data stored in the road bin, determining, with a set of predetermined rules, a subset of the identified visible POIs for the user device to present to a user, and transmitting information about the subset of POIs to the user device.

In another example, a method includes receiving routing data for directing a user from an origin location to a destination location. Such routing data may include a route and instructions for following the route. The method further includes determining a set of road bins through which the route passes and identifying a set of POIs that are visible along the route using information from the determined set of road bins. As a user moves along the route, the method includes receiving updated location data from the user device and transmitting routing instructions related to the visible POIs to the user device. Routing instructions may include information about the route in relation to the POIs that are visible along the route.

The features and advantages described in this summary and the following detailed description are not all-inclusive. Many additional features and advantages will be apparent to one of ordinary skill in the art in view of the drawings, specification, and claims hereof.

Figure 1:
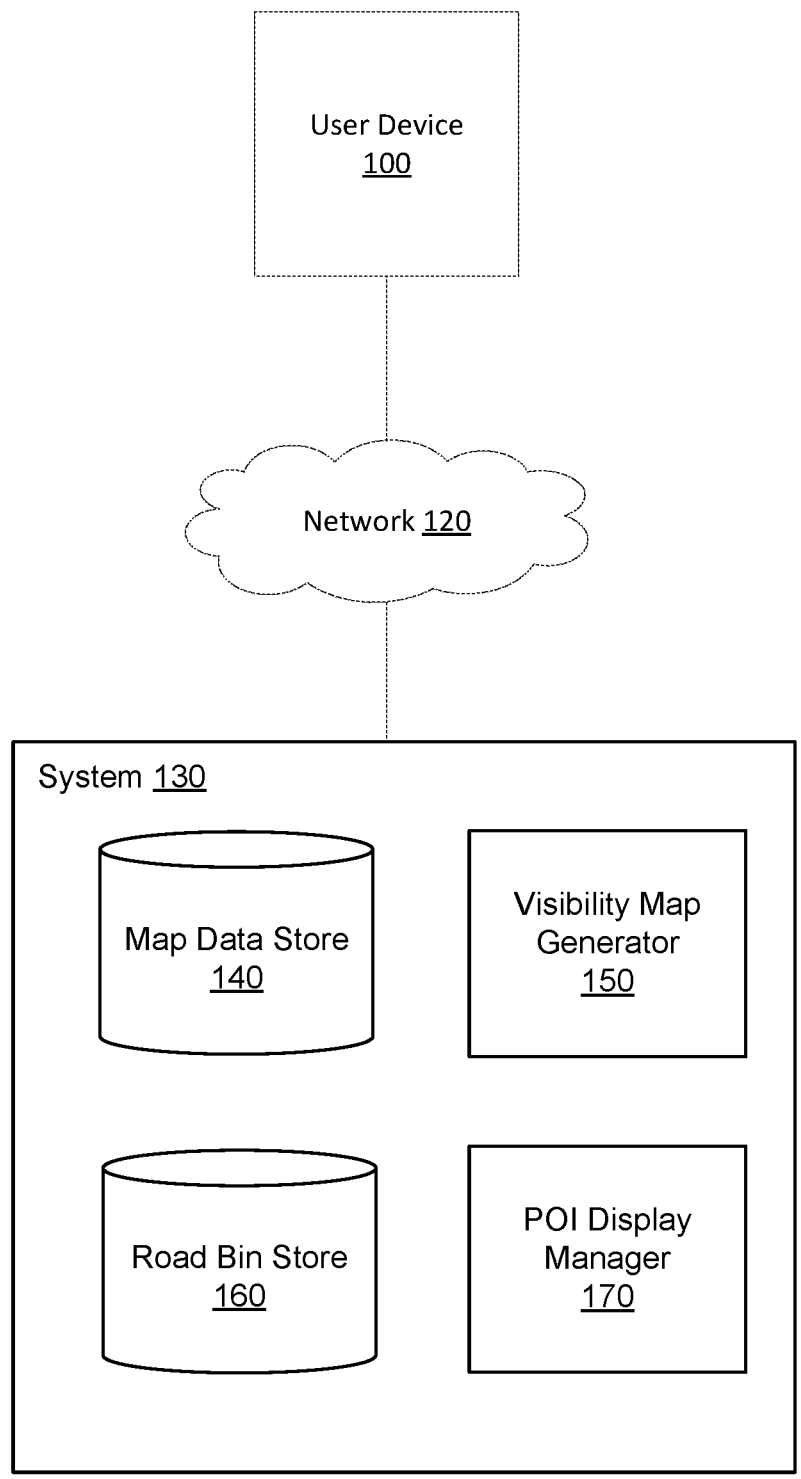
FIG. 1 is a block diagram of a system for identifying points of interest (POIs) that are visible from a location, in accordance with some embodiments.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

A system identifies points of interest (POIs), e.g., landmarks, to a user in a graphical user interface (GUI) according to a level of visibility of the POI from the user's location. For example, a navigation system can inform a user operating a vehicle (e.g., a car) to turn when a particular landmark becomes visible to the user from within the vehicle. Such information about POIs can be especially useful in regions where roads do not have names, or when the system does not have data about road names.

The system stores data about the visibility of individual POIs. For example, the system may store a visibility map of the visibility of each POI within a region. A visibility map may be in the format of a heat map or a choropleth map in that it associates regions of a geographic area with a value that represents the intensity, amount, or ease of visibility of a POI from each region. Such a visibility map may include data about locations from which a POI is visible, distances at which the POI is visible, portions of the POI that are visible from different locations, headings in which a POI is visible, descriptions related to the POI, etc.

The system keeps track of which POIs are visible from different geographic areas by storing identifiers of POIs in logical data groupings related to the geographic areas from which the POIs are visible. Such geographic data groupings are herein referred to as "road bins". More specifically, a road bin is a data structure that stores data in relation to a geographic location. For example, a road bin may be defined by a geofence around a portion of a road segment on a map. Data related to a location along a road may be stored and accessed via the road bin that includes the location. The POI visibility maps are used to determine which POIs should be associated with each road bin. Conceptually, a road bin stores information identifying POIs having visibility maps that indicate that the POI is visible from at least one position within the road bin. In one embodiment, multiple road bins may be associated with the same area of a map, each of the road bins representing a heading (e.g., a road bin associated with a northbound heading may include POIs that are visible to users in the road bin area who are facing or moving north). This creates a mapping between specific visible POIs and the road bins from which they are visible.

As a user moves along a route, the user device may send a query to the system requesting a set of POIs that are visible from the user's current location. When sending such a query, the user device also sends positional data about its current location and heading, for example, GPS coordinates. In some embodiments, the query may further include requests for specific metadata about the visible POIs (e.g., description, distance, name, an image, etc.). The system determines a road bin that includes the location of the user, and determines the visible POIs that are associated with the road bin. In embodiments that use different road bins associated with specific headings, the system determines a road bin that includes the user's location and the user's heading. In some embodiments, the system may additionally determine a subset of the visible POIs to present to the user. The set of POIs that are visible from the user's location (as well as any requested metadata about the POIs) is subsequently transmitted to the user device.

FIG. 1 is a block diagram of a system for identifying POIs that are visible from a location, in accordance with some embodiments. FIG. 1 includes user device 100, network 120, and system 130. For clarity, only one user device 100 is shown in FIG. 1. As shown in FIG. 1, system 130 further comprises map data store 140, visibility map generator 150, road bin store 160, and POI display manager 170. Alternate embodiments of the system environment can have any number of user devices 100 as well as multiple systems 130. The functions performed by the various entities of FIG. 1 may vary in different embodiments. System 130 may provide routing, direction, and timing information to user device 100. In some embodiments, system 130 may coordinate travel for a user, for example, by reporting information about a requested route to the user or by providing the user with information about POIs along the route.

A user may interact with system 130 through user device 100. For example, a user may enter origin and destination information when requesting information about a route. User devices 100 can be personal or mobile computing devices, such as smartphones, tablets, or notebook computers. In some embodiments, user device 100 executes a client application that uses an application programming interface (API) to communicate with system 130 through network 120.

Client applications that are configured to interact with system 130 can present information received from system 130 on a user interface of user device 100. Information presented by such applications may include a map of the geographic region, the current location of user device 100, estimated trip duration, and POIs associated with a route. The client application running on user device 100 may be able to determine the current location of user device 100 and provide the current location to system 130.

User devices 100 can communicate with system 130 via network 120, which may comprise any combination of local area and wide area networks employing wired or wireless communication links. In some embodiments, all or some of the communication on network 120 may be encrypted.

System 130 includes various modules and data stores to determine POIs that are visible from different locations and to determine which POIs to present to a user of user device 100. System 130 comprises map data store 140, visibility map generator 150, road bin store 160, and POI display manager 170. Computer components such as web servers, network interfaces, security functions, load balancers, failover servers, management and network operations consoles, and the like are not shown so as to not obscure the details of the system architecture. Additionally, system 130 may contain more, fewer, or different components than those shown in FIG. 1 and the functionality of the components as described herein may be distributed differently from the description herein.

Map data store 140 stores maps of geographic regions in which system 130 generates routes, identifies POIs, and offers trip coordination services. The maps contain information about roads within the geographic regions. For the purposes of this disclosure, roads can include any route between two places that allows travel by foot, motor vehicle, bicycle or another form of travel. Examples of roads include streets, highways, freeways, trails, bridges, tunnels, toll roads, waterways, airways, or crossings. Roads may be restricted to certain users, or may be available for public use. Roads can connect to other roads at intersections. An intersection is a section of one or more roads that allows a user to travel from one road to another. Roads may be divided into road segments, where road segments are portions of roads that are uninterrupted by intersections with other roads. For example, a road segment would extend between two adjacent intersections on a surface street or between two adjacent entrances/exits on a highway.

Map data store 140 also includes map features, which may be stored in association with regions, road segments, or routes. Map features can include road features that describe characteristics of a map, such as POIs, placement of road signs, speed limits, road directionality (e.g., one-way, two-way), traffic history, traffic conditions, addresses on a road segment, lengths of road segments, and road segment type (e.g., surface street, residential, highway, toll). The map properties can also include features associated with intersections, such as road sign placement, the presence of traffic signals, turn restrictions, light timing information, throughput, and connecting road segments. In some embodiments, the map features also include properties describing the geographic region as a whole or portions of the geographic region, such as weather within the geographic region, geopolitical boundaries (e.g., city limits, county borders, state borders, country borders), and topological properties.

In some embodiments, map data store 140 stores information about virtual delineations of regions (e.g., geofences). A geofence is a virtual perimeter geographically enclosing a portion of map data. Geofences are used to delineate specific geographic regions and may be applied for various reasons, such as categorization or alerts. In one embodiment, a large region is subdivided into many smaller regions using geofences, and data about map features is collected with respect to effects or presence within individual geofences. Geofences may be established along political boundaries (e.g., city borders), census tracts, neighborhood outlines, using arbitrary grid cells (e.g., an overlay of hexagons on a map), or as a group of grid cells selected in view of one or more characteristics of the region corresponding to the cells. In one embodiment, the boundaries of a geofence are described using geographic coordinates (e.g., latitude and longitude). In some embodiments, road bins and cells of visibility maps may be represented by geofences.

Map data store 140 additionally stores information about POIs. Map data related to POIs may include names or common descriptions of the POIs, geographic locations of the POIs, popularity of POIs, etc. Furthermore, map data store 140 stores a visibility map corresponding to each POI. A visibility map includes information about locations in a region from which a particular POI is visible. For example, a visibility map may be a map of a region that has been divided into cells, each cell having associated scores related to the visibility of the POI from locations within the cell.

Visibility map generator 150 generates visibility maps for POIs and stores the visibility maps in map data store 140. In some embodiments, visibility map generator 150 is provided with imagery and location data collected from roads within a region as input for creating a visibility map. For example, panoramic images and video may be captured at a variety of locations within a region. In some embodiments, panoramic videos may be captured using a panoramic camera attached to the top of a vehicle as it moves within the region. Visibility map generator 150 may analyze images and corresponding geographic locations and headings to determine visibility scores for cells of the visibility maps using one or more metrics for measuring the visibility of a POI. For example, visibility map generator 150 may analyze the images to determine a percentage of the pixels in an image that represent the POI, or a number of frames in a video in which the POI is visible. In some embodiments, system 130 may receive visibility maps or scores for regions within visibility maps from an outside source as an alternative to creating visibility maps locally with visibility map generator 150.

A visibility map may be divided into cells. Visibility map generator 150 may assign each cell a visibility score associated with the visibility of the corresponding POI from within the cell. Cells can vary in size. For example, a cell can be an area that is several feet square, or may be larger, such as several square miles. A visibility score value may be determined according to a variety of inputs. In some embodiments, visibility map generator 150 may assign scores based on the frequency with which some or all of a POI appears in a frame of video. In some embodiments, a POI's visibility from a location may be assigned a value corresponding to a quantity or percentage of pixels of an input image that contribute to the image of the POI. In some embodiments, a cell of a visibility map may be assigned a binary value indicating whether or not the POI is visible from somewhere within the area, rather than receiving a score indicative of a degree to which the POI is visible. Visibility maps are described in more detail with respect to FIG. 3.

Road bin store 160 stores data that associates road bins with POIs that are visible from locations within geographic areas corresponding to those road bins. In one embodiment, road bin store 160 includes information about the boundaries of individual road bins and their relationships to road segments and routes on a map of the region. In some cases, road bin store 160 may include multiple road bins with similar or overlapping boundaries, which include information about POIs that are visible in specific headings (e.g., a northbound road bin, an eastbound road bin, etc.). For example, a two-way road with an eastbound direction and a westbound direction may have separate road bins associated with the eastbound and westbound headings in which vehicles travel along the road. Such data may also be included in map data store 140. Road bin store 160 may take the form of a lookup table in which a key is a road bin and an associated value is a set of POIs that are visible from within the road bin. In some embodiments, all POIs that are in some way visible from a location within the road bin may be included in the set of POIs associated with a road bin. In some embodiments, only POIs with at least a threshold visibility score are included in the set of associated POIs. In some embodiments, data in the road bin store may be updated periodically or whenever new data about POI visibility is received by system 130.

POI display manager 170 determines information about POIs to transmit to user device 100. System 130 receives requests for information about visible POIs from user devices 100. In one embodiment, user device 100 may send information about a planned route (or user device 100 may send origin and destination locations so that system 130 can determine a route). Accordingly, POI display manager 170 determines a set of POIs associated with one or more of the road bins through which the route passes by searching for the road bins and their associated POIs in road bin store 160. POI display manager 170 may select a subset of the POIs along the route to transmit to user device 100. For example, POI display manager 170 might transmit information about five POIs along the route with the highest visibility scores.

In an alternative embodiment, user device 100 sends its current location to system 130 along with a request for information about visible POIs. POI display manager 170 determines a road bin that includes the current location (and, in some cases, the current heading) of user device 100 and queries road bin store 160 for the set of POIs that are visible from within the road bin. POI display manager 170 selects POIs from the set of visible POIs associated with the road bin and sends information about the selected POIs to user device 100. By repeatedly querying system 130 for information about visible POIs, user device 100 can receive information about additional visible POIs as it moves through a region.

Figure 2:
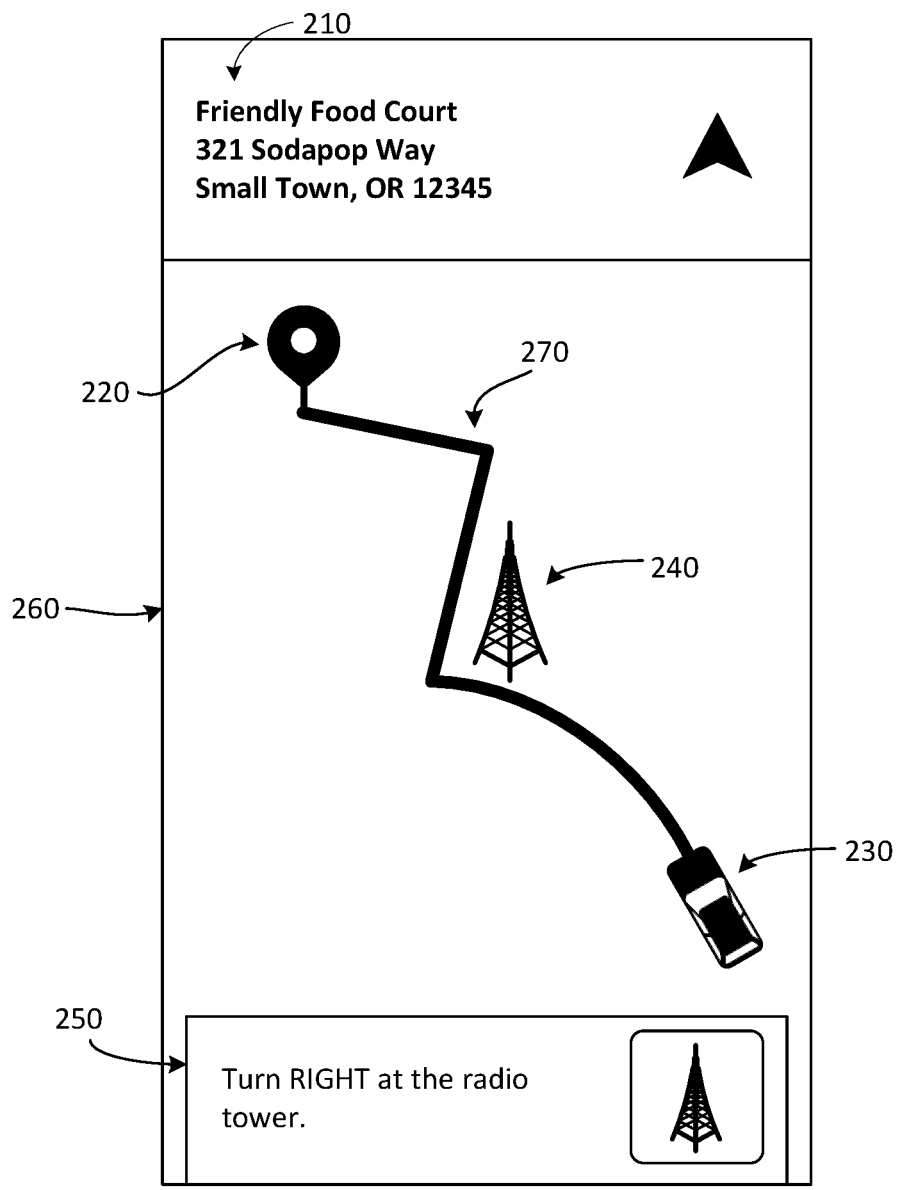
FIG. 2 is an example user interface displaying navigation instructions using landmarks, in accordance with some embodiments.

FIG. 2 is an example user interface displaying navigation instructions using landmarks, in accordance with some embodiments. The example of FIG. 2 shows a navigation routing application on a mobile device. Destination address 210 is displayed near the top of the screen. Destination marker 220 indicates a location of destination address 210 on map 260. Current location marker 230 (e.g., a car symbol) shows the current location of the user device 100 in relation to map 260. Route 270 between current location marker 230 and destination marker 220 is drawn on map 260. In the example of FIG. 2, POI marker 240 indicates a radio tower that is located along route 270. As a user using user device 100 navigates from a current location to the destination, user device 100 may provide navigation instructions 250 related to POIs along route 270. For example, navigation instructions 250 depicted in FIG. 2 suggest that the user "turn RIGHT at the radio tower." In some embodiments, more POIs may be displayed on map 260 and not all displayed POIs are necessarily related to navigation instructions 250. According to one embodiment, navigation instructions that include information about POIs may also be presented to a user in an audio format, for example, so that a user can hear navigation instructions about visible POIs while navigating a vehicle.

Figure 3:
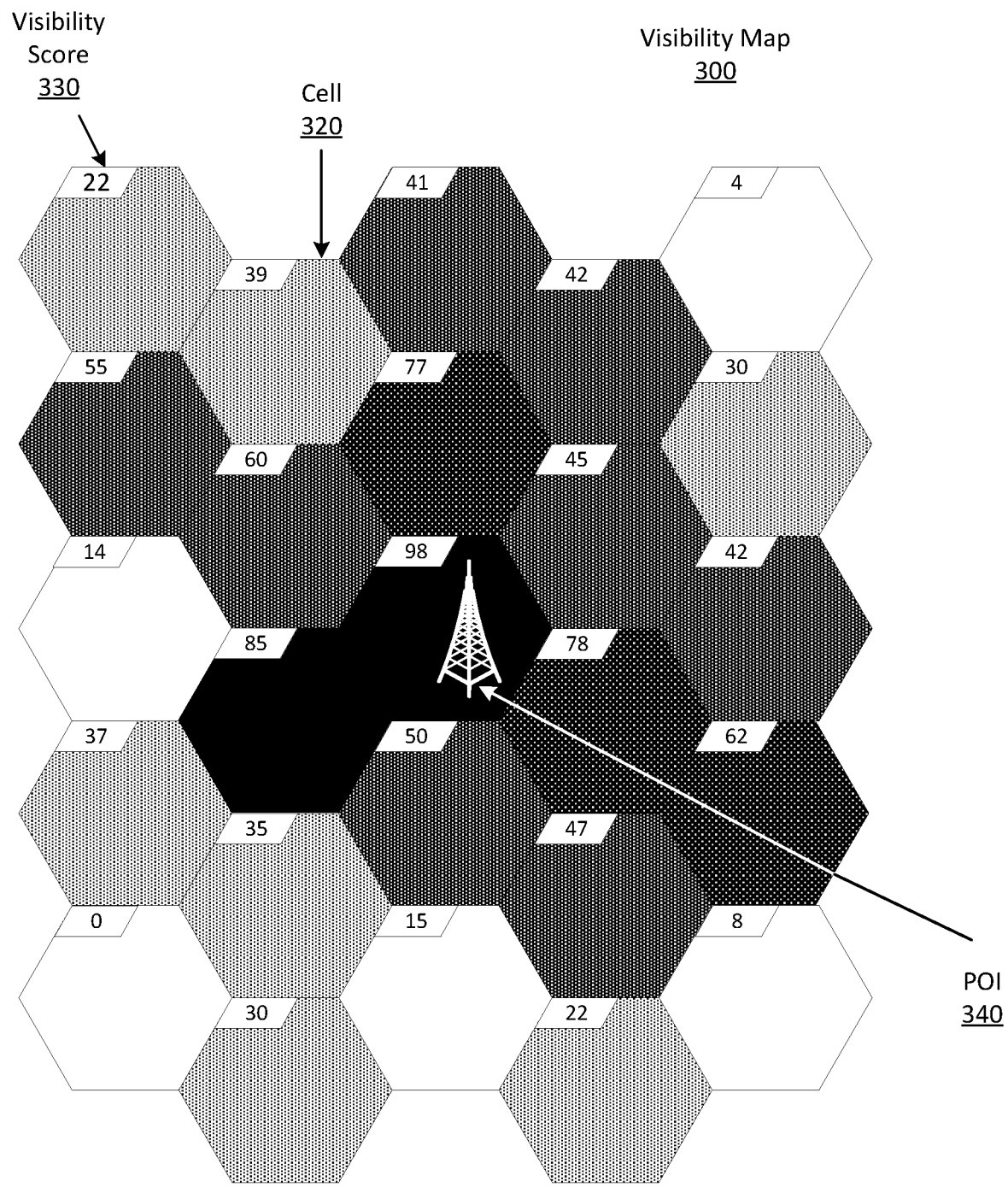
FIG. 3 illustrates an example POI visibility map, in accordance with an embodiment.

FIG. 3 illustrates an example POI visibility map, in accordance with an embodiment. Visibility map 300 is associated with POI 340 and represents how visible POI 340 is from different parts of a region. Visibility map 300 may be conceptualized as a heat map of locations and headings from which POI 340 is visible. Visibility maps 300 may cover various sizes and shapes of regions. For example, a visibility map 300 may represent how visible a POI 340 is from miles away (e.g., for a skyscraper), or a visibility map 300 may describe only the visibility of a POI 340 from geographic locations near the POI (e.g., for a statue).

According to one embodiment, visibility map 300 may include cells 320 of the represented region. In the example of FIG. 3, the geographic region represented by visibility map 300 is divided into hexagonal cells 320. As was described in the description of FIG. 1, each cell is assigned a visibility score 330 by visibility map generator 150. In some embodiments, each score on visibility map 300 may represent individual locations from which the POI is visible, rather than being an aggregate visibility score 330 that is representative of all locations within a cell 320.

Using data from images (e.g., panoramas) collected from locations around a region, visibility scores 330 may be assigned to different cells 320 of heat map 300. Image processing techniques may be used to determine when a particular POI is shown in an image and to determine additional information about images that include the POI. Visibility scores 330 for cells may be determined based on a variety of visibility metrics. A visibility score 330 may correspond to a number of frames of video taken within a cell 320 in which POI 340 is detected, a number of pixels of an image that are used to represent POI 340, a perceived height or distance of POI 340, a heading in which a camera was moving when it captured an image of POI 340, or a measure of how frequently POI 340 disappears and reappears in the view of a camera for a sequence of images or video frames. It is appreciated that a person of skill in the art will recognize additional metrics for scoring the visibility of a POI using data from captured images.

Figure 4:
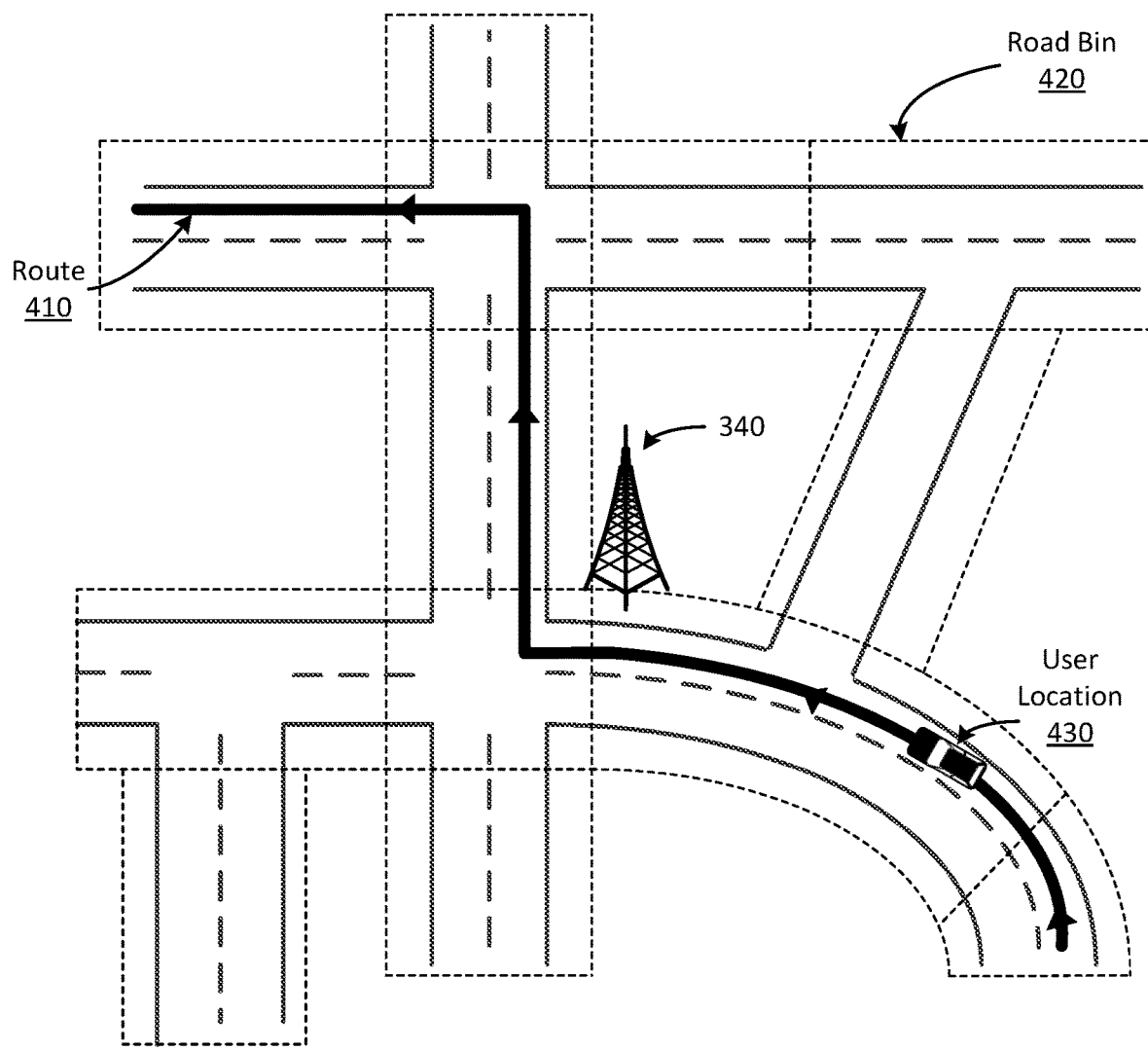
FIG. 4 illustrates an example of using road bins to associate a location of a user device with visible POIs, in accordance with an embodiment.

FIG. 4 illustrates an example of using road bins to associate a location of a user device with visible POIs, in accordance with an embodiment. FIG. 4 shows map data including roads, POI 340, and road bins 420 (outlined by thinly dashed lines). Data about road bins 420 is stored in road bin store 160. In one embodiment, a road bin 420 may be conceptualized as a designated area or geofence that surrounds locations through which a route may pass. In the example of FIG. 4, different road bins 420 are dedicated to different portions of roads and intersections. In some embodiments, road bins 420 may include areas that are not associated with roads. For example, a map of a geographic region could be divided into a grid and each grid cell may be considered a road bin 420 even though a road may not pass through every cell of the grid.

As described in reference to FIG. 1, a road bin 420 may be represented in road bin store 160 as a data format that maps the geographic area enclosed by road bin 420 to a set of POIs 340 that are visible from within road bin 420. In some embodiments, multiple road bins 420 may represent the same geographic area, each of the overlapping road bins 420 storing a set of POIs 340 that are visible to a user facing in a certain direction (e.g., the road bins 420 may be organized according to heading). Whether a POI 340 is visible from within a road bin 420 is determined using visibility scores 330 associated with cells 320 of visibility maps 300 that intersect with road bin 420. That is, a road bin 420 may be associated with one or more POIs 340 that are associated with a location or cell 320 within or overlapping with the geographic area represented by the road bin 420. In some embodiments, the road bin store 160 also includes data about the relative prominence of POIs 340 that are associated with a road bin 420. For example, a road bin 420 may store visibility scores 330 that correspond to POIs 340 that are visible from locations within road bin 420. In some embodiments, rather than storing visibility scores 330 of POIs 340 in road bins 420, each road bin 420 may store data that ranks associated POIs 340 according to their relative prominences from within the road bin 420.

Road bins 420 are used to identify POIs 340 that may be visible to a user of user device 100 when the user is physically located at a geographic location that is within the map area defined by road bin 420. For example, in FIG. 4, user location 430 is represented by a car symbol. User device 100 at the user location 430 may query system 130 for information about POIs 340 that are visible from user location 430. Such a query may include data about user location 430 and the heading of the user. POI display manager 170 may search road bin store 160 for a road bin 420 that corresponds to user location 430 and, in some embodiments, the user heading. POI display manager 170 then selects a set of POIs 340 from among the POIs 340 that are associated with the road bin 420 to display or describe to the user via user device 100. In some embodiments, user device 100 may query system 130 for information about POIs 340 that are visible along an entire route 410, rather than POIs 340 associated with a specific user location 430. In such cases, POI display manager 170 may search road bin store 160 for all road bins 420 through which the route 410 passes, and determine which POIs 340 to display or describe to the user from among the set of all POIs 340 that are associated with at least one road bin 420 along route 410.

POI display manager 170 does not necessarily send information about every visible POI 340 associated with a road bin 420 to user device 100. Developers may program POI display manager 170 with rules and conditions that determine which of the POIs 340 should be shown. Such rules and conditions may be simple limits placed on a number of POIs 340 to display, or they can be more complex algorithms that determine which POIs will be useful to a user. In some embodiments, POI display manager 170 may select a subset of the associated POIs 340 to send to user device 100. As an illustrative example, POI display manager 170 may only transmit three POIs 340 associated with each road bin 420 to a user device 100. In some embodiments, the POIs 340 may be ranked, for example according to how recognizable they are, or how often users of system 130 have requested them as destinations in the past. Information about a predetermined number of the most highly ranked POIs 340 may be sent to the user device 100.

In another embodiment, POI display manager 170 may select POIs 340 based on the extent to which they are visible from locations within road bin 420. The visibility scores in a visibility map that corresponds to a POI 340 may be used by POI display manager 170 to determine whether to transmit information about the POI to a user device 100. For example, POI display manager 170 may determine one or more cells 320 of a visibility map 300 that overlap with the boundaries of a road bin 420. Based on a visibility score associated with each such cell of the visibility map, POI display manager 170 may determine whether to transmit information about the POI 340 to user device 100 (e.g., if the visibility score is above a threshold level). As another example, map data store 140 may include a dispersal score for each POI 340, the dispersal score calculated using an average distance at which the POI 340 is visible (e.g., taller POIs may have larger dispersal scores). POI display manager 170 may select POIs to display in view of a comparison of these dispersal scores.

In some embodiments, POIs 340 may be associated with different categorizations by system 130. For example, POIs 340 may be classified as monuments, natural features, buildings, stores, restaurants, etc. POI display manager 170 may select POIs 340 from a specific category to display at user device 100. Such a category selection may be made according to a context of a trip. For example, if a user device 100 requests information about POIs 340 along a route 410 with a destination located at a museum, POI display manager 170 may select other POIs 340 categorized as museums that may be visible along the route 410 for displaying to the user.

As still another embodiment, certain POIs 340 may always be included for display to the user by POI display manager 170. For example, well-known POIs 340 (e.g., the Eiffel tower) may be preprogrammed to always be included for transmission to user device 100 when they are in the set of POIs 340 associated with a road bin 420. Similarly, POI display manager 170 may always include a POI 340 that is associated with a route destination, in some embodiments.

In addition to determining which POIs 340 to send to user device 100, POI display manager 170 may determine when and how the POIs 340 should be displayed to a user. POIs 340 may be displayed by user device 100 as soon as information about them is received from system 130 or as user device 100 comes within a certain distance of each POI 340. POIs 340 may be displayed with varying degrees of emphasis depending on distance, popularity, associated visibility scores, etc. Furthermore, POI display manager 170 may determine whether POIs 340 should disappear from a display of user device 100 when the device is no longer in a location from which the POI 340 is visible to a user of the user device 100.

Figure 5:
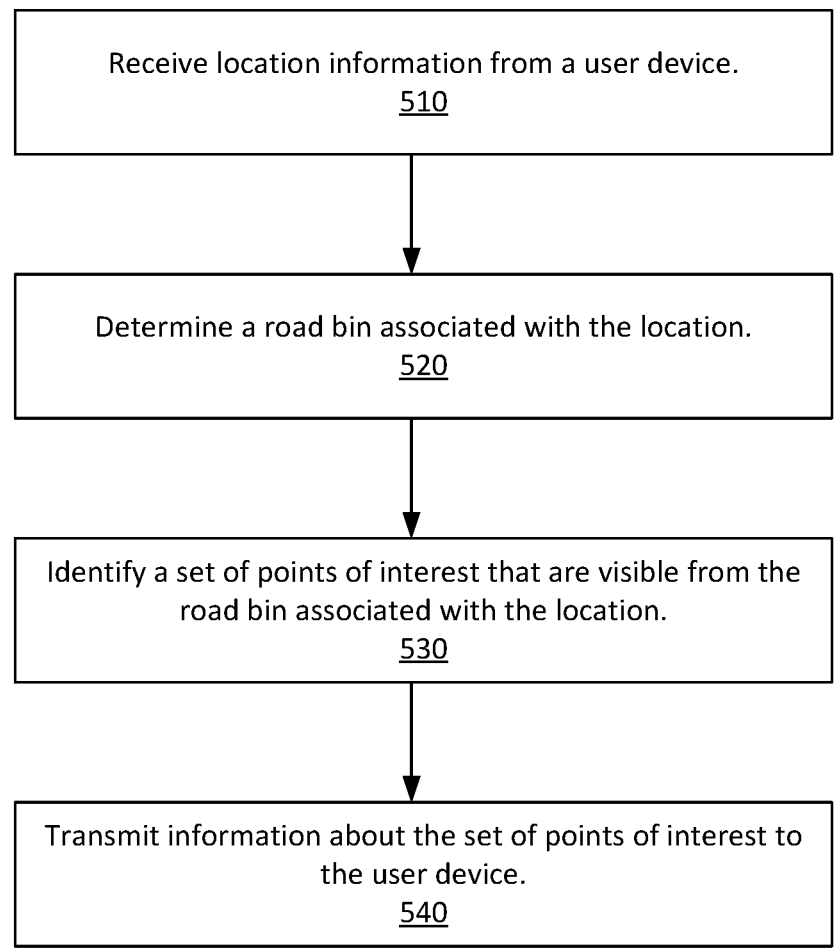
FIG. 5 is a flowchart illustrating a process for providing a user device with information about POIs, in accordance with an embodiment.

FIG. 5 is a flowchart illustrating a process for providing a user device with information about visible POIs, in accordance with an embodiment. System 130 receives 510 location information from a user device. Using the location information, system 130 determines 520 a road bin associated with the location information. For example, the location may be included in the region of the road bin or the location information may describe a route that travels through the road bin.

The system identifies 530 a set of POIs that are visible from the determined road bin. In some embodiments, the set of POIs that are visible from a road bin are determined according to information stored in visibility maps related to POIs. After determining which POIs are visible from the location and determining which of the visible POIs to describe to the user, system 130 transmits 540 information about the set of POIs to the user device 100, where it may be presented to a user in a visible or audible format.

Figure 6:
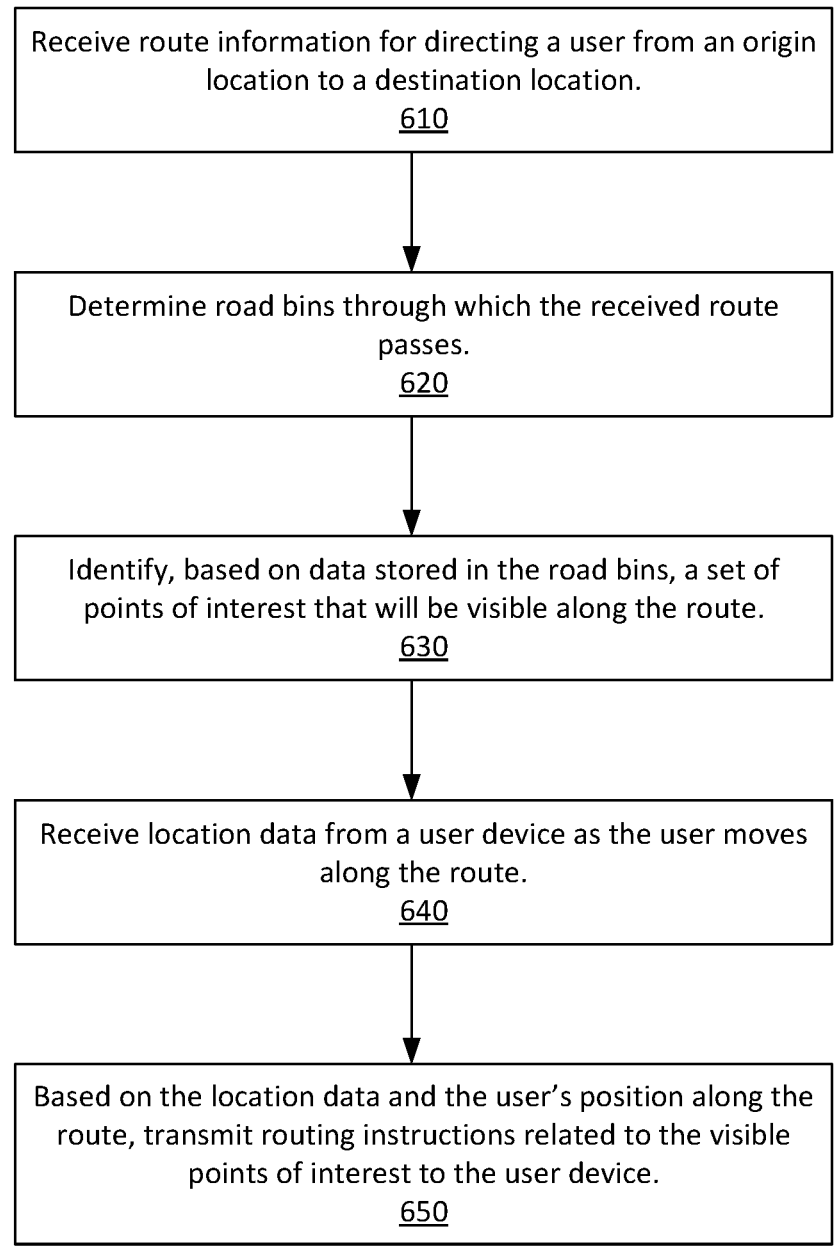
FIG. 6 is a flowchart illustrating a process for providing a user device with routing instructions related to visible POIs along a route, in accordance with an embodiment.

FIG. 6 is a flowchart illustrating a process for providing user device 100 with routing instructions related to visible POIs along a route, in accordance with an embodiment. System 130 receives 610 route information for directing a user from an origin location to a destination location. In some embodiments, system 130 may generate the route and routing information. System 130 determines 620 a set of road bins through which the route passes and identifies 630 a set of POIs that will be visible to the user as the route is traversed using the data stored in the road bins.

As the user follows the route, system 130 receives 640 location data from the user device 100. In view of the location data and the user's position along the route, system 130 transmits 650 routing instructions related to the visible POIs to user device 100. For example, system 130 may receive user location data indicating that the user needs to turn at the next road, and may subsequently transmit instructions to user device 100 for the user to turn past a particular POI on the corner.

Figure 7:
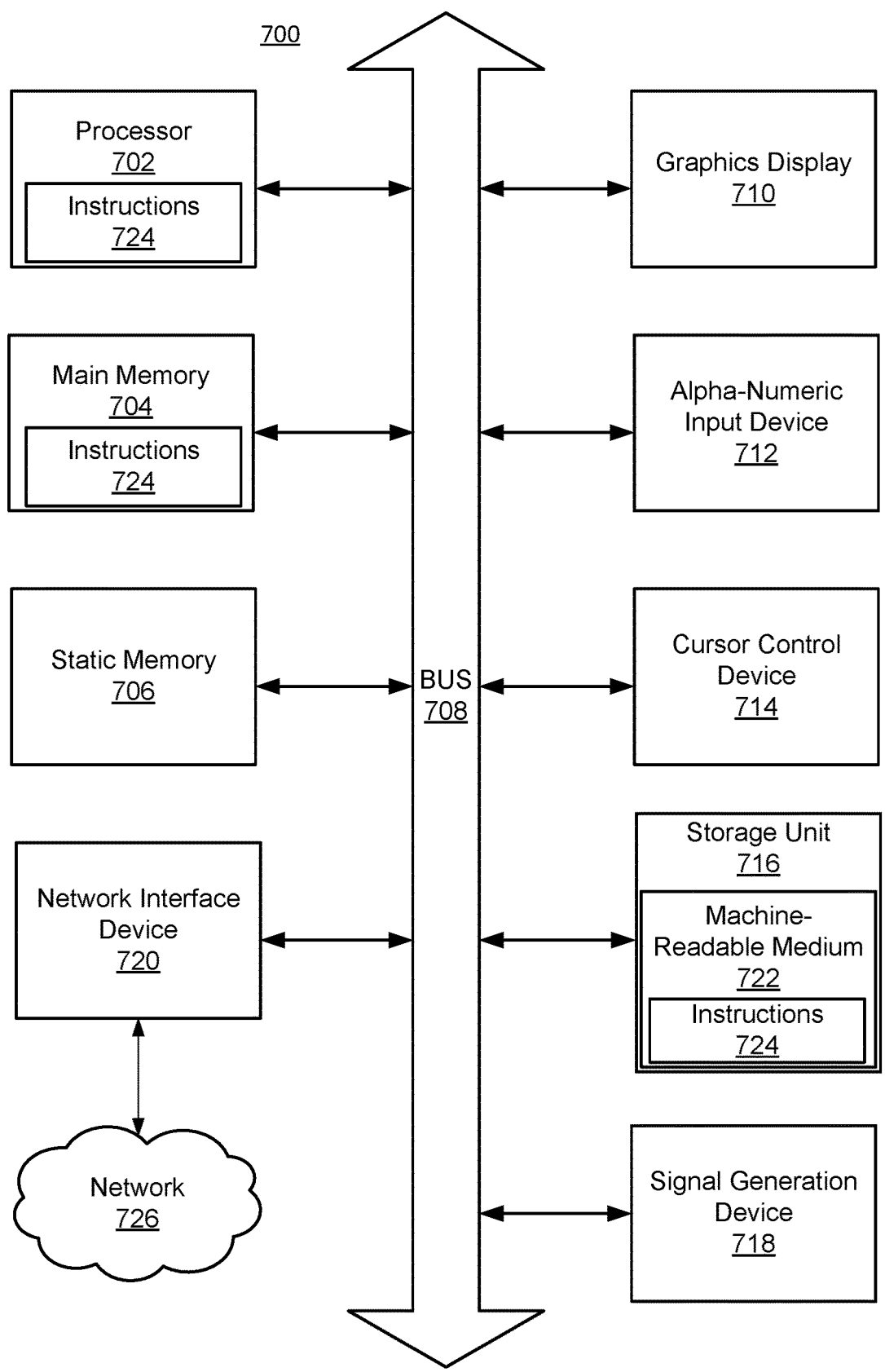
FIG. 7 is a block diagram illustrating components of an example machine able to read instructions from a machine-readable medium and execute them in one or more processors, in accordance with an embodiment.

FIG. 7 is a block diagram illustrating components of an example machine able to read instructions from a machine-readable medium and execute them in one or more processors (or controllers). Specifically, FIG. 7 shows a diagrammatic representation of system 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 706 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the visibility map generator 150 or the POI display manager 170. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer implemented method for providing route guidance, the method comprising:
    receiving routing data for directing a user from an origin location to a destination location, the routing data including a route;
    determining a set of road bins through which the route passes, wherein each road bin includes a geofence and data about points of interest (POIs) that are visible from within the geofence;
    identifying, based on the determined set of road bins, a set of POIs that are visible along the route; and
    as the user moves along the route from the origin location to the destination location:
        receiving location data from a user device, the location data indicating the user's current location, and orientation along the route; and
        transmitting routing instructions related to the visible POIs to the user device, the routing instructions including information about the route in relation to the POIs that are visible at the user's current location and orientation along the route.

2. The computer-implemented method of claim 1, wherein each POI is associated with a visibility map that identifies an extent to which each POI is visible from geographic locations within a region.

3. The computer-implemented method of claim 2, wherein a visibility map associated with a POI comprises a map of a geographic region divided into cells, each cell having a visibility score that represents an extent to which the POI is visible from locations within the cell.

4. The computer-implemented method of claim 2, wherein identifying a set of POIs that are visible along the route comprises:
    for each road bin and for each POI associated with the road bin:
        determining cells of the visibility map associated with the POI that correspond geographically with the geographic region of the road bin and have visibility scores greater than a predetermined threshold value; and
    selecting the POIs with associated visibility maps that include one or more of the determined cells.

5. The computer-implemented method of claim 1, wherein a rule for determining a subset of the identified visible POIs for the user device to present to a user comprises selecting no more than a pre-determined number of POIs that are associated with a road bin.

6. The computer-implemented method of claim 1, wherein receiving location data from a user device comprises:
    receiving information about the current geographic location and geographic orientation of the user device; and
    receiving a request for information about POIs that are visible from a region associated with the location and orientation of the user device.

7. The computer-implemented method of claim 1, wherein transmitting routing instructions related to the visible POIs to the user device includes transmitting information about when POIs should be presented to a user.

8. A non-transitory computer-readable storage medium storing computer program instructions executable by one or more processors of a system to perform steps comprising:
    receiving routing data for directing a user from an origin location to a destination location, the routing data including a route;

determining a set of road bins through which the route passes, wherein each road bin includes a geofence and data about points of interest (POIs) that are visible from within the geofence;

identifying, based on the determined set of road bins, a set of POIs that are visible along the route; and as the user moves along the route from the origin location to the destination location:

receiving location data from a user device, the location data indicating the user's current location, and orientation along the route; and transmitting routing instructions related to the visible POIs to the user device, the routing instructions including information about the route in relation to the POIs that are visible at the user's current location and orientation along the route.

9. The non-transitory computer-readable storage medium of claim 8, wherein each POI is associated with a visibility map that identifies an extent to which each POI is visible from geographic locations within a region.

10. The non-transitory computer-readable storage medium of claim 9, wherein a visibility map associated with a POI comprises a map of a geographic region divided into cells, each cell having a visibility score that represents an extent to which the POI is visible from locations within the cell.

11. The non-transitory computer-readable storage medium of claim 9, wherein identifying a set of POIs that are along the route comprises:

for each road bin and for each POI associated with the road bin:

determining cells of the visibility map associated with the POI that correspond geographically with the geographic region of the road bin and have visibility scores greater than a predetermined threshold value; and selecting the POIs with associated visibility maps that include one or more of the determined cells.

12. The non-transitory computer-readable storage medium of claim 8, wherein a rule for determining a subset of the identified visible POIs for the user device to present to a user comprises selecting no more than a pre-determined number of POIs that are associated with a road bin.

13. The non-transitory computer-readable storage medium of claim 8, wherein receiving location data from a user device comprises:

receiving information about the current geographic location and geographic orientation of the user device; and receiving a request for information about POIs that are visible from a region associated with the location and orientation of the user device.

14. The non-transitory computer-readable storage medium of claim 8, wherein transmitting routing instructions related to the visible POIs to the user device includes transmitting information about when POIs should be presented to a user.

15. A computer system comprising:

one or more computer processors for executing computer program instructions; and a non-transitory computer-readable storage medium storing instructions executable by the one or more computer processors to perform steps comprising:

receiving routing data for directing a user from an origin location to a destination location, the routing data including a route;

determining a set of road bins through which the route passes, wherein each road bin includes a geofence and data about points of interest (POIs) that are visible from within the geofence;

identifying, based on the determined set of road bins, a set of POIs that are visible along the route; and as the user moves along the route from the origin location to the destination location:

receiving location data from a user device, the location data indicating the user's current location, and orientation along the route; and transmitting routing instructions related to the visible POIs to the user device, the routing instructions including information about the route in relation to the POIs that are visible at the user's current location and orientation along the route.

16. The computer system of claim 15, wherein each POI is associated with a visibility map that identifies an extent to which each POI is visible from geographic locations within a region.

17. The computer system of claim 16, wherein a visibility map associated with a POI comprises a map of a geographic region divided into cells, each cell having a visibility score that represents an extent to which the POI is visible from locations within the cell.

18. The computer system of claim 16, wherein identifying a set of POIs that are along the route comprises:

for each road bin and for each POI associated with the road bin:

determining cells of the visibility map associated with the POI that correspond geographically with the geographic region of the road bin and have visibility scores greater than a predetermined threshold value; and selecting the POIs with associated visibility maps that include one or more of the determined cells.

19. The computer system of claim 15, wherein a rule for determining a subset of the identified visible POIs for the user device to present to a user comprises selecting no more than a pre-determined number of POIs that are associated with a road bin.

20. The computer system of claim 15, wherein receiving location data from a user device comprises:

receiving information about the current geographic location and geographic orientation of the user device; and receiving a request for information about POIs that are visible from a region associated with the location and orientation of the user device.

* * * * *